United States Patent [19]

Allan

[11] 4,159,617
[45] Jul. 3, 1979

[54] RESILIENT POLYESTER FIBERS

[75] Inventor: John T. Allan, Charlotte, N.C.

[73] Assignee: Fiber Industries, Inc., New York, N.Y.

[21] Appl. No.: 147,688

[22] Filed: May 27, 1971

Related U.S. Application Data

[63] Continuation-in-part of Ser. No. 877,470, Nov. 17, 1969, abandoned, which is a continuation-in-part of Ser. No. 806,721, Mar. 12, 1969, abandoned.

[51] Int. Cl.² .................... D02G 3/04; D02G 1/00; D02G 3/02
[52] U.S. Cl. .................... 57/247; 57/243; 264/345; 264/346; 428/362; 428/364; 428/369
[58] Field of Search ............. 57/34 R, 34 HS, 140 R, 57/140 BY, 157 R, 157 S, 157 TS; 428/362, 364, 369, 357, 373; 264/168, 210 S, 335, 290 T, 345, 346; 528/302

[56] References Cited

U.S. PATENT DOCUMENTS

| | | | |
|---|---|---|---|
| 2,604,689 | 1/1952 | Hebeler | 264/168 |
| 2,623,034 | 12/1952 | Flory et al. | 528/308 |
| 3,050,821 | 8/1962 | Kilian | 5/337 |
| 3,071,783 | 1/1963 | Gamble | 5/337 |
| 3,279,164 | 10/1966 | Breen et al. | 57/157 TS |
| 3,350,871 | 11/1967 | Pierce | 57/245 |
| 3,435,603 | 4/1969 | Rice | 57/34 HS |
| 3,488,940 | 1/1970 | Mehta | 57/157 TS |
| 3,549,597 | 12/1970 | Kitson et al. | 264/345 X |
| 3,608,299 | 9/1971 | Dugas | 57/287 |
| 3,671,379 | 6/1972 | Evans et al. | 428/362 |

OTHER PUBLICATIONS

Smith et al. "Preparation & Properties of Poly(methylene terephthalates)," Jour. of Polymer Sci., vol. 4, Part A-1 (1966) 1851–1859.

Goodman et al.: "Polyesters, vol. 1, Saturated Polymers" pp. 48–53, 1965.

*Primary Examiner*—Donald Watkins
*Attorney, Agent, or Firm*—Roderick B. Macleod; Robert J. Blanke; Marvin Turken

[57] ABSTRACT

A resilient drawn polyester textile fiber comprised of at least 50 mol percent of poly(tetramethylene terephthalate) with a bending recovery of at least 55 percent and a toughness of at least 0.75 grams/denier is provided. This fiber, which preferably consists essentially of 100 mol percent poly(tetramethylene terephthalate) and has an initial modulus of less than 350 k.g./mm² and a tensile factor of at least about 21, is especially useful in pile fabrics.

28 Claims, No Drawings

RESILIENT POLYESTER FIBERS

This application is a continuation-in-part of application Ser. No. 877,470 (filed Nov. 17, 1969) now abandoned which latter application was a continuation-in-part of application Ser. No. 806,721 (filed Mar. 12, 1969), all now abandoned.

Polyesters derived from terephthalic acid or its derivatives are known to possess sufficient fiber resilience to warrant commercial utility in areas of the textile industry where resilience is a major product requirement, e.g., carpets, pile liners and fiberfill. The polyester fiber which has found wide acceptance by the textile industry is polyethylene terephthalate. Polyethylene terephthalate does not however, possess those physical characteristics which define a premium carpet or fiberfill fiber and more specifically, polyethylene terephthalate is lacking in the appropriate degree of fiber resilience, as well as certain other physical parameters which will be hereinafter defined.

In accordance with this invention there is provided a resilient polyester fiber containing poly(tetramethylene terephthalate), said fiber having a toughness ([tenacity $\times$ elongation $\div$ 200]) of at least 0.75 grams/denier.

Fiber resilience may be defined in terms of bending recovery for filaments having a circular cross section, bending recovery being measured as follows: ten turns ($n_1$) of the fiber are wound onto a wire of known diameter under a wrapping tension of 0.04 grams per denier at a rate of 20 turns per minute. After 30 seconds the filament is cut just beyond the last turn, and after a recovery period of one minute, the number of turns ($n_2$) remaining is counted. The bending recovery is given by $$(1 - 0.1 \times n_2) \times 100\%$$

The surface strain (e) of the bent filament can be varied by using wires of different diameter (D) and is computed by $$e = \left(\frac{d}{D+d}\right) \times 100$$

where d is the filament diameter.

Bending recovery as we refer to it is the recovery at 20% surface strain.

When bending recovery of a crimped fiber is to be determined, the fiber is first subjected to a temperature in excess of the glass rubber transition temperature under a specified tension and for a specified period of time. The crimped fibers of this invention are subjected to a temperature of 175° C. under a tension of 0.05 grams per denier for a period of 5 minutes. The bending recovery tests are then made according to the procedure previously described.

For satisfactory application as carpet face yarn or pile liners or fiberfill, the fiber must be a crimped fiber and should preferentially possess a bending recovery in excess of about 40%. Polyethylene terephthalate, the most commonly produced polyester may be produced with a maximum fiber bending recovery in the range 45 to 55%.

In addition to the parameter of the fiber bending resilience used in defining the fibers of this invention, other parameters for drawn uncrimped heat relaxed fibers of initial tensile modulus, tensile recovery, tensile work recovery and polymer relative viscosity may be used.

The "initial tensile modulus" (represented by the symbol Ml) is defined as the slope of the first reasonably straight portion of a stress-strain curve of the funicular structure obtained by plotting tension on a vertical axis vs. elongation on a horizontal axis as the structure is being elongated at the rate of 10% per minute under standard conditions of temperature (21° C.) and humidity (60%RH). In almost every instance, this first reasonably straight portion is also the steepest slope to be found on the curve. The values as used herein are in units of kilograms per square millimeter per 100% elongation. A low-tensile modulus is indicative of a preferred fiber.

The "tensile recovery" (TR) is defined as the extent to which the yarn recovers its original length after being stretched, a stress-strain curve being used to determine tensile recovery under the testing conditions. The test consists in extending the funicular structure at a constant rate of elongation of 10% per minute. A specimen is held at the maximum elongation desired for 30 seconds, e.g., by the use of a time switch, and is then allowed to retract at the same rate at which it was extended. The specimen is extended 5.0% for each determination. The extension during elongation and the recovery during retraction are measured along the elongation axis. The percent tensile recovery ($TR_5$) is then the ratio of the extent to which the yarn retracts to the extent to which it was elongated times 100. This test is run under standard conditions at 60% RH and 21° C. When a stress-strain curve is plotted from tensile recovery, values for "work recovery" may be obtained from the equation $$\text{work recovery} = \frac{\text{area under recovery curve}}{\text{area under extension curve}} \times 100$$

Relative viscosity is a measure of the degree of polymerization of the polymer and is the ratio of the viscosity of an 8% solution (8 grams of polymer dissolved for about 30 minutes at 100° C. in 100 milliliters of freshly distilled orthochlorophenol at a temperature of 100° C.) to the viscosity of freshly distilled orthochlorophenol, per se, measured in the same units at 25° C.

It has now been discovered that highly resilient fibers of the type referred to above may be obtained from crimped polytetramethylene terephthalate fibers having bending recoveries in excess of 55% (and preferably in excess of 70%) and that such fibers demonstrate superior performance in pile fabrics and filling fiber relative to known commercial polyester products. The term "pile fabric" as employed herein is meant to include any fabric wherein erect yarns or fibers are deliberately produced on cloth which form all or part of the surface of the fabric. Included in this definition are products such as carpets and pile liners. The term "filling fiber" as employed herein is meant to include staple fiberfill and continuous filament tow suitable for stuffing pillows and the like. Preferably the polytetramethylene terephthalate fibers have an initial tensile modulus of less than 350 kg/mm$^2$, a tensile recovery ($TR_5$) greater than 60%, a work recovery ($WR_5$) greater than 30% and a relative viscosity greater than 18.

The term "crimped" as employed herein is meant to include fibers having more than 6.0 crimps per crimped inch and more than 18.0 percent crimp. Crimps per crimped inch are measured by applying a small tension to a length of tow and randomly counting the number of crimps in 20 one-inch lengths. These numbers are averaged to give the number of crimps per inch. The percent crimp is determined by measuring the length of a section of tow under zero tension, $L_c$, and measuring the length of the same section of tow under just enough tension to remove all of the crimp from the fibers, $L_u$. The percent crimp is then calculated by the formula $$\% \text{ Crimp} = \frac{L_u - L_c}{L_u} \times 100$$

Crimping methods which are suitable for use in conjunction with this invention are stuffer box crimping, steam jet or other hot fluid crimping, gear crimping and the like. The preferred method for crimping the fiber when it is to be cut into staple is by means of a stuffer box crimper. The fiber is not preconditioned before entry into the crimper, but is partially stress relaxed in the crimper stuffer box by injection of steam or other hot fluids. While all of the fibers contemplated for use in this invention have more than 6.0 crimps per crimped inch and more than 18.0 percent crimp, the preferred levels in the case of carpet staple fiber are at least 9.0 crimps per uncrimped inch and at least 20.0 percent crimp.

Although the fiber-forming material is principally polytetramethylene terephthalate, other modifying materials may be present in total quantities of up to 50 mol percent based on the final composition of the polymer batch. During the preparation of the polytetramethylene terephthalate, another glycol and/or another dicarboxylic acid may be added. Examples of suitable glycols are hydroquinone; cis and trans-cyclohexanedimethanol; 1,1-bis-(hydroxymethyl)-cyclohexane; 2,2,3,3-tetramethyl-1,3-cyclobutanediol; 1,4-cyclohexanediol; ethylene glycol; 1,5-pentanediol; 1,12-dodecanediol; diethylene glycol; triethylene glycol; 2,2-dimethylpropanediol-1,2; 2,2,3,3,4-4-hexafluoropentanediol-1,5; decahydro-1,2-bis-(hydroxymethyl) napthalene; 4,4'-dihydroxybiphenyl; 4,4'-dimethanolhexahydrobiphenyl; bis-(4-hydroxyphenyl) methane; bis-(4-hydroxyphenyl) ether; bis-(4-hydroxyphenyl) sulfone; bis-(4-hydroxyphenyl) ketone; bis-(4-hydroxyphenyl) sulfoxide; 2,2-bis(4-hydroxyphenyl)hexafluoropropane; 2,2-bis-(4-hydroxyphenyl) propane; bis(4-hydroxyphenyl) cyclohexylmethane; 2,5-norbornanediol; phenolphthalein; bis-(4-hydroxyphenyl) oxindole; 1,4-bicyclo (2.2.2) octanedimethanol; 9,10-bis($\beta$-hydroxyethyl) octahydroanthracane; trimethylol ethane; pentaerythritol; methyl diethanolamine; t-butyl diethanolamine; dechydro-1,5-bis(hydroxymethyl) naphthalene; decahydro-1,8-bis-(hydroxymethyl) naphthalate; decahydro-2,3-bis(hydroxymethyl) naphthalene.

Examples of suitable dicarboxylic acids which might be used in copolymers with poly(1,4-butylene terephthalate) are isophthalic acid; hexahydro terephthalic acid; homophthalic acid; para-carboxyphenoxyacetic acid; para-carboxyphenylacetic acid; 8-(para-carboxyphenyl) octanoic acid; phenylenediacetic acid; chloroterephthalic aicd; fluoroterephthalic acid; 2,5-dichloroterephthalic aicd; 4-chloroisophthalic aicd; 3,6-bis (carboxymethyl)durene; oxalic acid; adipic acid; sebacic acid; 1,4-naphthalenedicarboxylic acid; 1,5-naphthalene-dicarboxylic acid; 2,6-naphthalenedicarboxylic acid; 2,7-naphthalenedicarboxylic acid; 4,4'-dicarboxybiphenyl; 3,3'-dicarboxybiphenyl; bis-(4-carboxyphenyl) butane; bis-(4-carboxyphenyl) octane; bis-(4-carboxyphenoxy) ethane; bis-(4-carboxyphenoxy) hexane; bis-(4-carboxyphenylmethyl)ether; bis-(4-carboxyphenylmethyl) ketene; biphenylenediacetic acid; biphenylenedibutyric acid; bis-(4-carboxyphenyl) ether; bis-(4-carboxyphenyl) sulfide; bis-(4-carboxyphenyl) sulfone; bis-(4-carboxyphenyl) ketone; 4,4'-dicarboxybenzanilide; bis-(4-carboxyphenoxyethane); bis-(4-carboxy-thiophenoxy) ethane; ethyl bis-(4-carboxyphenyl-)amine; 2-8-di-benzofurandicarboxylic acid; 1,4-bicyclo (2.2.2) octane dicarboxylic acid; cis and trans 4,4'-stilbenedicarboxylic acid.

It should be obvious to one skilled in the art that hydroxy acids may also be usually employed, for example: 4-hydroxybenzoic acid; 3-chloro-5-hydroxybenzoic acid; 4-(2-hydroxyethyl)benzoic acid; poly(ethylene diphenoxyethane-4,4'-dicarboxylate) p-($\omega$-hydroxyalkyl-benzoic acid); aliphatic hydroxy acids or their lactones such as propiolactone and $\gamma$-hydrobutyric acid.

The poly(tetramethylene terephthalate) polymer may be prepared by either ester interchange processes or by direct esterification processes. Examples of the former processes are given in U.S. Pat. No. 2,465,319, while examples of the latter process are given in U.S. Pat. No. 3,050,533. Additional information on poly(methylene terephthalate) processes and the properties of the uncrimped products may be had from *Journal of Polymer Science:* Part A-1, Vol. 4, 1851–1859 (1966).

The following specific examples are given for purposes of illustration and should not be considered as limiting the spirit or scope of this invention.

EXAMPLE I

Polytetramethylene terephthalate chip having an R.V. of 25.3 is prepared by an ester interchange process, and is then formulated into a melt and extruded through an annular pack containing 96 holes and having a diameter of 0.018", the extrusion being conducted at a rate of 34.3 lbs. per hour, maintaining a pack outlet temperature of about 260° C. The extrudate is subjected to an outflow quench at a flow rate of 80 cubic feet per minute, and the resultant fiber bundle taken up at a windup speed of 2000 feet per minute resulting in a spun denier/filament of 40. A spin finish is then applied, the spin finish comprising a non-ionic and cationic lubricating agent, together with an anti-static agent, all of which are in aqueous solution. The pick-up is adjusted so that the finish level on the spun tow is about 0.05% by weight.

The partially crystalline spun yarn, having a birefringence in the range from 0.070 to 0.080 is then drawn through a hot water immersion bath at 82° C. to effect a draw ratio of 3.20. The drawn yarn is then passed through a finish bath comprising a nonionic lubricant and a cationic lubricant, and an anti-static agent, all of which are in an aqueous medium. The finish level is adjusted so as to produce a pick-up of 0.30% by weight on the yarn. The yarn is then passed into a stuffer box crimper and a crimp level of 11 crimps per inch is obtained. The crimped yarn is then heat set into tow form by subjecting it to temperatures of about 150° C. for a period of 18 minutes, after which the heat set tow is cut into 6" staple lengths. The resultant staple fiber is found to have a tenacity of 3 to 3.6 grams per denier and an elongation to break of 50 to 60 percent. Bending recovery is found to be 85%.

EXAMPLE II

Polytetramethylene terephthalate having an R.V. of 25.4 is obtained by a direct esterification process and then reduced to chip.

The chip is then spun, drawn, crimped and cut into staple lengths, according to the process as outlined in Example I. The staple fibers are found to have a tenacity of 3 to 3.6 grams per denier and an elongation to break of 50 to 60 percent. Bending recovery is 83%.

EXAMPLE III

Polyethylene terephthalate chip having an R.V. of 14.7 is formulated into a melt and extruded through an annular pack containing 96 holes of 0.024" diameter at a rate of 45.6 pounds per hour, the pack being maintained at an outlet temperature of 278° C. The extrudate is subjected to an outflow quench at a flow rate of 80 cubic feet per minute and is wound up at a speed of 2000 feet per minute so that a spun denier per filament of 53.4 is obtained. A spin finish is then applied to the fiber bundle, the spin finish comprising non-ionic and cationic lubricating agents together with anti-static agents in a water solution. The bath is adjusted so as to produce a pick-up of 0.07 percent by weight on the tow. The spun yarn is found to have a birefringence in the range of 0.0014 to 0.0024 and to be completely amorphous. The yarn is then subjected to the drawing, crimp forming and staple forming operations as set forth in Example I. The staple fiber is found to have a tenacity of 3.0 to 3.6 grams per denier and an elongation to break of 50 to 60 percent. Bending recovery is found to be 48%.

In order to evaluate the suitability of the polytetramethylene terephthalate fibers as resilient carpet face yarns, yarns are formulated from Examples I and II, which were polytetramethylene terephthalate yarns and compared with similar yarns formulated from the staple fibers of Example III which was a polyethylene terephthalate staple fiber. 16 Denier per filament staple fibers are employed to prepare yarns having a 2.0/2 cotton count, the singles having 3.5 turns of Z twist, and a ply twist of 3 turns per inch S twist. These yarns are then formulated into cut pile carpets having a pile weight of 35 ounces per square yard, and a pile height of 9/16 inch, the carpets being produced by tufting 6.5 stitches per inch with a 5/32 gauge tufting machine into a 36" width jute backing. Sample specimens measuring 36" × 18" with the 18" width direction parallel to the warp are then prepared. Test samples are vacuumed and allowed to relax freely for 24 hours. The original pile thickness is then determined at 0.75 psig. The tested samples are then placed in a traffic pattern wherein traffic is measured by a 100,000 step counter (manufactured by Vedder-Root, Hartford, Connecticut). After 5000 steps had been counted, the samples are removed and a thickness measurement is taken. The samples are then vacuumed and replaced in testing. Measurements are repeated for 10,000 steps and 20,000 steps. Samples are then shampooed, vacuumed, allowed to relax for two hours, and again measured for thickness. The samples are then once more subjected to the traffic pattern, and removed after a total of 30,000 and 50,000 steps. Percent thickness retained (at each step level) is then determined as compressed thickness over original thickness multiplied by 100. As a result of this testing procedure, the following values are obtained, as reported in the following table designated as Table I:

TABLE I

| Step Level | Percent Thickness Retained | | |
|---|---|---|---|
| | Ex. I | Ex. II | Ex. III |
| 0 | 100.0 | 100 | 100 |
| 3,500 | 96.3 | 95.8 | 92.0 |
| 8,500 | 93.8 | 93.5 | 85.9 |
| 21,000 | 89.0 | 88.5 | 77.6 |
| After Shampoo | 98.5 | 98.0 | 84.6 |
| 32,400 | 86.1 | 86.0 | 71.0 |
| 46,100 | 83.0 | 83.5 | 67.7 |

EXAMPLE IV

Polymer as in Example I is extruded through a spinnerette so as to produce 2.25 denier tow, the tow is then converted to 3" staple fibers on a tow-converting device. Staple fibers are then spun to a 7.75 turn per inch, 10/1 cotton count yarn. The yarn is then knit on a 30" 22-gauge Tompkins spring needle machine to produce a fabric having a 14.5 ounce per square yard weight and having all polytetramethylene terephthalate face yarns on a cotton backing. The resultant knit fabric is then napped as follows: Two low energy passes are made through a napper, followed by one low energy pass made through a double action napper. The back of the fabric is then coated with latex resin and cured at 325° F. for two minutes. A final low-energy pass is made through a single action napper to comb the fabric.

An additional knit fabric, identical in all respects, with the exception that the staple fiber was polyethylene terephthalate polymer, is employed in preparing the staple fiber. The two fabrics are laundered at 120° F. and dried. Subsequent wear trials are found to show that the polytetramethylene terephthalate fabric has superior resilience retention compared with the polyethylene terephthalate pile fabric.

EXAMPLE V

Polymer as in Example I is extruded through a spinnerette such as to produce 5 denier per filament tow. The final tow product is then subjected to a stuffer box crimping operation such as to produce 10 crimps per inch and then cut into 2⅛" fibers. The fibers are then processed in a garnet machine and converted to 10 oz. batting. The batting is cut to 10" × 10" size and stacked in units of 3. The three unit test specimen is then placed in a Rubber Manufacturers Association tester which has as its principal parts a 50 square inch presser foot, a 250 pound capacity scale, a scale dial for determining distance of presser foot from the table loading top at any load, and a movable table top with a speed control device. The sample is inserted between the presser foot and the table top and the table top raised until a one pound load is indicated. The height of the specimen is then measured and recorded as initial loft. The table is again raised for a plurality of load increments until the 50 pound load is reached. Each of these increments is measured as compressed loft. In order to determine loft retention, a similar sample consisting of three stacked 10" × 10" squares of batting is placed in the corner of an ordinary muslin pillow casing. A 170 lb. weight is then repeatedly lowered on the sample at a rate of 60 cycles per minute, the weight being selected and designed so as to simulate a load received by a furniture cushion. At the end of 5000 cycles, the sample is placed in the Rubber Manufacturers Association test machine, and the percent loss of loft is determined at various loads. When the polytetramethylene terephthalate batting is compared with a polyethylene terephthalate batting which is similar in all respects with the exception that the polymer employed, it is found, quite surprisingly, that the polytetramethylene terephthalate batting has significantly lower losses in loft than the polyethylene terephthalate batting.

EXAMPLE VI

Fifty (50) parts of the poly(1,4-butylene terephthalate) polymer chip of R.V. 25.3 is mixed with fifty (50) parts of polyethylene terephthalate polymer chip of R.V. 14.7 and extruded through an annular pack under conditions as described in Example I except that the pack outlet temperature is maintained at 275° C.

The spun yarn with a birefringence range of 0.010 to 0.030 is drawn, heat set, and relaxed as previously described. The yarn is found to have a tenacity of 3.5 gpd, elongation of 44%, and bending recovery of 65% when measured at the conditions previously described.

EXAMPLE VII

Melt blended copolymers are prepared by the methods described in Example VI, the specific blends having physical properties as set forth in Table II.

TABLE II

| Polymer Composition | Tenacity, gpd | Elongation (%) | Bending Recovery, % |
|---|---|---|---|
| 75% poly(1,4-butylene terephthalate) 25% polyethylene terephthalate | 3.9 | 40 | 75 |
| 90% poly(1,4-butylene terephthalate) 10% polyethylene terephthalate | 4.1 | 48 | 80 |
| 50% polyethylene terephthalate | 2.5 | 74 | 55 |
| (hot roll drawing alone) | | | |

As can be seen from Examples VI and VII and Table II, copolymers of poly(1,4-butylene terephthalate) containing major proportions on a mol basis of other polyester forming constituents also give the desirable bending resilience properties associated with the homopolymers itself.

What is claimed is:

1. A resilient drawn polyester textile fiber comprising at least 50 mol percent of poly(tetramethylene terephthalate), said fiber having a toughness (tenacity × elongation ÷ 200) of at least 0.75 grams/denier and a bending recovery at 20 percent surface strain of at least 55%.

2. The fiber of claim 1, wherein said fiber has an initial modulus of less than 350 k.g./mm$^2$.

3. The fiber of claim 1, wherein said fiber has a tensile recovery of greater than 60 percent.

4. The fiber of claim 1, wherein said fiber has a bending recovery at 20 percent surface strain in excess of 70 percent.

5. The fiber of claim 1, wherein said fiber has a bending recovery at 20 percent surface strain in excess of 80 percent.

6. The fiber of claim 1, wherein said poly(tetramethylene terephthalate) has a relative viscosity greater than 18.

7. The fiber of claim 1, wherein said fiber has a work recovery greater than 30 percent.

8. The fiber of claim 1 having a tenacity of 3.0 to 3.6 grams per denier and an elongation to break of from 50 to 60 percent.

9. The fiber of claim 1 having a tensile factor (tenacity × √elongation) of at least about 21.

10. The fiber of claim 1, wherein said fiber has crimp in an amount more than 6.0 crimps per crimped inch.

11. The fiber of claim 10, wherein said crimped fiber has more than 18.0 percent crimp.

12. The fiber of claim 1, wherein said fiber has an initial modulus of less than 350 k.g./mm$^2$, a tensile recovery of greater than 60 percent, a work recovery greater than 30 percent, a tensile factor (tenacity × √elongation) of at least about 21; and said poly(tetramethylene terephthalate) has a relative viscosity greater than 18.

13. The fiber of claim 12, wherein said fiber has a bending recovery at 20 percent surface strain in excess of 70 percent.

14. The fiber of claim 12, wherein said fiber has a bending recovery at 20 percent surface strain in excess of 80 percent.

15. The fiber of claim 13, wherein said fiber has crimp in an amount more than 6.0 crimps per crimped inch and said crimped fiber has more than 18.0 percent crimp.

16. The fiber of claim 14, wherein said fiber has crimp in an amount more than 6.0 crimps per inch, and said crimped fiber has more than 18.0 percent crimp.

17. The fiber of claim 1 comprising at least 75 mol percent poly(tetramethylene terephthalate).

18. The fiber of claim 1 comprising at least 90 mol percent poly(tetramethylene terephthalate).

19. The fiber of claim 1 consisting essentially of 100 mol percent poly(tetramethylene terephthalate).

20. The fiber of claim 16 consisting essentially of 100 mol percent poly(tetramethylene terephthalate).

21. The fiber of claim 10 in the form of a face yarn for a pile fabric.

22. The fiber of claim 12 in the form of a face yarn for a pile fabric.

23. The fiber of claim 14 in the form of a carpet face yarn.

24. The fiber of claim 20 in the form of a carpet face yarn, said face yarn, when it has a twist of 3.5Z × 3.0S and a cotton count of 2.0/2 and is tufted into a cut pile carpet having a pile weight of 35 ounces per square yard and a pile height of 9/16 of an inch, has a walkout rating of not less than 70 percent thickness retention after 50,000 steps.

25. A pile carpet comprised of the face yarn of claim 21, said carpet having a walkout rating of not less than 70 percent thickness retention after 50,000 steps.

26. A pile carpet comprised of the face yarn of claim 24, said carpet having a walkout rating of not less than 70 percent thickness retention after 50,000 steps.

27. A process for the preparation of a resilient polyester fiber with a toughness of at least 0.75 grams/denier comprising the step of heatsetting a fiber comprised of at least 50 mol percent of poly(tetramethylene terephthalate) for at least 5 minutes at a temperature of at least about 150 degrees centigrade.

28. The process of claim 27, wherein said resilient polyester fiber has a bending recovery of at least 70 percent; and wherein said fiber consists essentially of 100 mol percent of poly(tetramethylene terephthalate) having a relative viscosity greater than 18.

* * * * *